United States Patent [19]
Pichler et al.

[11] Patent Number: 5,718,185
[45] Date of Patent: Feb. 17, 1998

[54] HERRINGBONE-TYPE ROTARY MILKING PARLOUR

[75] Inventors: Olaf Pichler, Hamburg, Germany; Christopher Kelson Oliver, Glenview, New Zealand

[73] Assignee: Alfa Laval Agri AB, Tumba, Sweden

[21] Appl. No.: 750,407

[22] PCT Filed: Jun. 2, 1995

[86] PCT No.: PCT/EP95/02106

§ 371 Date: Feb. 27, 1997

§ 102(e) Date: Feb. 27, 1997

[87] PCT Pub. No.: WO95/33367

PCT Pub. Date: Dec. 14, 1995

[30] Foreign Application Priority Data

Jun. 9, 1994 [DE] Germany ................... 9409372 U
Jun. 22, 1994 [NZ] New Zealand ................. 260823

[51] Int. Cl.$^6$ ................................. A01J 5/00
[52] U.S. Cl. ................................ 119/14.04
[58] Field of Search ................. 119/14.01, 14.02, 119/14.03, 14.04, 14.08

[56] References Cited

U.S. PATENT DOCUMENTS

| | | |
|---|---|---|
| 2,039,562 | 5/1936 | Shordron ............... 119/14.03 |
| 2,236,851 | 4/1941 | Haselton ............... 119/14.03 |
| 2,472,122 | 6/1949 | Polivka ................ 119/14.03 |
| 3,203,280 | 4/1993 | Nelson . |
| 3,759,225 | 9/1973 | Galbraith . |
| 3,765,373 | 10/1973 | Phillips . |

FOREIGN PATENT DOCUMENTS

| | | |
|---|---|---|
| 1459399 | 12/1976 | European Pat. Off. . |
| 541517A2 | 5/1993 | European Pat. Off. . |
| 2650741 | 5/1877 | Germany . |

Primary Examiner—Thomas Price
Attorney, Agent, or Firm—Hovey, Williams, Timmons & Collins

[57] ABSTRACT

A rotary milking parlor comprises an annular milking platform (12) and a central milker pit, as well as: a radially directed accessway (16) at the outer periphery of milking platform (12) to allow cows to enter their milking stalls (32) head first from the outside; an external, radially directed exitway from milking platform (12) and adjacent accessway (16) to allow the cows to exit their milking stalls (32) head first; radially inner rear barriers (20) on milking platform (12), and a front barrier (22) associated with each milking position and adapted to be moved to a forward cow access position. The milking stalls (32) for the cow access position. The milking stalls (32) for the cows are provided in a herringbone pattern on milking platforms (12) and each front barrier (22) is pivotable about a horizontal bottom axle (24) transverse to the longitudinal axis (33) of each milking stall (32).

20 Claims, 3 Drawing Sheets

HERRINGBONE-TYPE ROTARY MILKING PARLOUR

BACKGROUND OF THE INVENTION

1. Field of the Invention

The present invention relates to improvements in animal management systems and in particular to a herringbone-type rotary milking parlour.

Reference throughout this specification shall be made to use of the present invention in relation to managing cows for milking purposes. It should be appreciated however that the principles of the present invention can be used to manage other animals for other purposes, for example medical treatment, shearing and so forth.

Reference shall now specifically be made to the use of the present invention in relation to rotary milking parlours, however again it should be appreciated that the principles of the present invention could be applied to other situations.

2. Description of the Prior Art

A wide variety of stationary or rotary milking parlours has been known. Thus, a typical stationary herringbone milking parlour has front and rear corrugated cow position delimiting means (front and rear barriers), with the cows usually entering the milking parlour one after the other in such a manner that they step through the parlour in parallel with the milker pit and the frontmost cow moves to the rearmost parlour position and comes to a stand at an angle of approx. 30° to the milker pit to allow easy milker access to the cows' udders from the side. In the herringbone parlour, the cows assume a slightly angular side-by-side possition with their heads pointed towards the parlour side opposite the milker pit. In their milking positions in the herringbone parlour, adjacent animals are offset from each other by about one half their body length, as is customary practice.

In order to ensure that (in the aforesaid milking position) the animals are positioned right next to the rear barrier or parlour delimiting means at the milker pit so that their udders are within the milker's easy reach, it is necessary to keep the distance between the front and rear barriers or cow position delimiting means (mostly corrugated in herringbone parlours) as small as possible, taking the average cow length into account. This requirement results in some constraint on the animals as they enter the milking parlour, which has resulted in preferably the entire front barrier or cow position delimiting means in stationary parlours being displaced in parallel in a direction perpendicular to the milker pit (the so-called "indexing") so as to create more space for the cows entering the herringbone parlour.

U.S. Pat. No. 5,203,280 discloses a stationary herringbone milking parlour on both sides of a milker pit which the animals enter—as is customary in this type of a milking parlour—through an open gate at one end, which forces the foremost cow (of the group to be milked) to traverse the entire milking parlour until it assumes the front milking position in the parlour. The following animals do the same. No special measures are provided for facilitating animal entry and positioning in the milking parlour. However, each one of the front milking stall delimiting means or front barriers has the form of a gate pivotable about a horizontal axis above each cow. In one direction of rotation this gate can urge the cow backwards against the rear barrier at the milker pit; after the milking, the gate is acutated in the opposite direction so as to drive the cow from the milking stall.

It has been known that rotary milking parlours provide major advantages for the milking process if the cow herds to be milked are large. In this case, too, successive animal access to the milking parlour presents a number of difficulties, which are reflected in the various designs disclosed in British Patent 1,459,399. This patent discloses a rotary milking parlour with radial milking stalls in which the cows assume their milking positions with their heads directed towards the center. Access to such a milking position from the outside is fairly simple as the cow only has to step forward. Once milking is finished after one revolution, it is difficult for the cows, however, to leave their milking position, since they have to turn around completely on the platform so as to reach the radially outwardly pointing exit; this they can do only by making use also of the previously cleared adjacent milking stall.

In other words, one of the limiting factors when milking cows on a rotary parlour is the speed of exit and entry of the cows in relation to the platform of the parlour. For maximum efficiency, it is important that the cows are packed closely together on the platform so that a maximum of cows can be milked at any one time. To achieve this, the cows entering the parlour have only a limited amount of room in which to maneuver themselves into the appropriate milking position. It is this procedure which takes time and slows down the milking process considerably.

In another embodiment disclosed in British Patent 1,459,399, a hexagonal rotary milking platform basically has six rectilinear milking stalls placed one behind each other in a herringbone pattern. This platform has to be stopped for loading and unloading so that the groups of animals can successively enter or leave the respective platform section in parallel with the outer edge via an external ramp.

DE-OS 26 50 741 discloses a rotary milking parlour of the type acknowledged in the preamble of claim 1 in which the cows being milked stand in individual side-by-side and radially oriented stalls, with the cows' heads directed outwardly and the milker working at the center of the platform. The cows approach the milking platform radially from the outside and walk head first through a free stall. Behind the rear end of that stall they step on a stationary "transit platform", located in a central area of the rotary platform, on which the cows must turn around almost completely to enter the free stall next following in the direction of platform rotation, and then walk through that stall in the opposite direction until a vertically movable gate disposed at the radially outer end of the stall keeps them from exiting it while they are milked.

Another problem with rotary parlours is that cows come in variable sizes. Thus, a small cow may position itself in a milking position in such a manner that it makes it difficult for the farmer to reach the cow's udder to place the teat cups thereon. Thus, for consistent operation it would be desirable if there was a way by which the different sizes of cows could be accounted for so that the farmer need only reach the same distance each time to place the teat cups onto the cow's udder.

Another problem with cows of different sizes is that ideally the cow should fit as snugly into the milking position as possible to prevent undue cow movement during the milking process, something which all too easily happens with heifers.

SUMMARY OF THE INVENTION

In view of the foregoing, it is an object of the present invention to address the foregoing problems or at least provide the public with a useful choice. It is a further object of the present invention to improve a rotary milking parlour of the kind specified that it combines the advantages of a herringbone pattern with an unobstructed animal access/exit while at the same time ensuring that the cows will abut the rear barrier at any time during the milking process.

Further aspects and advantages of the present invention will become apparent from the ensuing description which is given by way of example only.

The invention makes it possible on a rotary milking parlour to combine the management and operating advantages of a herringbone cow positioning pattern with an easier animal access from the outside and, at the same time, to ensure that the cows are placed with their rear body ends directly at the rear barrier or stall delimiting means, i.e. as far rearwards as possible, and to enable the milker to work with them without problems.

According to one aspect of the present invention there is provided a system for restraining the movement of an animal in a defined area, the system including a movable restraining means arranged to push against the animal within the defined area. For ease of reference, the defined area shall be referred to as the milking stall on a rotary platform and the movable restraining means as being a headlock. It should be appreciated however that the present invention can apply to other defined spaces and to other restraining means, such as bars and so forth.

Preferably, the gate or headlock pivoting axle forms part of a bearing or hinge structure secured to the floor of the milking parlour. In this manner, and given a specific gate pivoting angle, the maximum possible clearance is created in the area of the greatest length of a cow, namely, at head height, so that the maximum possible space is available for a cow entering its milking position radially from the outside and for the animal's turning movement so required.

In preferred embodiments of the present invention, the movement of the headlocks on the rotary platform should be independent from each other so as to take account of the individual cow sizes. This is particularly important for a rotary milking system as it is a continuous milking system rather than a batch milking system such as those found with conventional stationary herringbone or parallel milking parlours.

In order to adapt the milking stall without problems to different average cow sizes, the distance of the pivot bearing from the rear barrier or inner stall delimiting means preferably is made adjustable—e.g. by appropriately located bores for fastening the pivot bearing or hinge to the floor of the annular platform of the rotary milking parlour.

While the movement of the headlock may be a set distance each time, in preferred embodiments movement of the headlock is a variable according to the size of the cow. For example, in manual versions of the present invention the farmer may be capable of moving the headlock back until the cow fits snugly in the milking stall and then lock the headlock into position.

Preferably the gate or headlock of each milking station is pivotable away from or towards the milking station by an actuating member in dependence on the rotary position of the milking parlour. In this manner, a cow that assumes its assigned milking stall after having left the access area of the milking platform will be urged rearwardly against the rear barrier or stall delimiting means; it will also be released as it reaches the exit. It is particularly preferred to have the gate or headlock move towards the milking stall, i.e. for gently constraining the cow, with a force and a speed both of which cause the gate or headlock to act gently on the cow as soon as the respective milking stall has left the access area. On the other hand, it is advantageous to release the cow swiftly, i.e. to pivot the gate away from the milking stall with a greater force and speed so as to get the cow to exit its milking stall rapidly and without delay.

In order to spare the cow from experiencing excessive constraining forces in its milking stall (e.g. while the milking platform rotates) and from becoming restless as a consequence, it is particularly advantageous to set the force biasing the gate or headlock towards the cow (for fixing the animal in position) at a level the cow can readily overcome.

In preferred embodiments of the present invention, the movement of the headlock may be automatic and responsive to the presssure of the cow against it.

For example, the headlock may have some biasing means (perhaps in the form of springs, hydraulic pressure, electric motor and so forth) which gently pushes against the cow until the cow is backed into the appropriate position in the milking stall. It has been found that a gentle biasing means on the headlock serves to keep most cows in position in the milking stall while not damaging the cow in any manner.

The front barrier/gate/headlock actuating member comprises a double-acting fluid cylinder operated by pressurized air, hydraulic oil or the like, with the cylinder being subjected to low pressure to move towards the milking position or stall and to high pressure to move away from the milking position or stall. Alternatively, two single-acting fluid cylinders acting in opposite directions may be used, of course.

In a particularly advantageous manner, the actuating member for pivoting the front barrier or gate is articulated to some upper extension of the rear barrier or milking stall delimiting means and to the top of the front barrier or gate or headlock, and this at a height above the cows in position on the milking platform. This position of the actuating member for the outwardly pivotable headlock of the rotary milking parlour eliminates the need for bracing or structure in addition to the headlock itself in the area of the platform periphery, which bracing and structure may present an obstacle to the cows' radially inward approach to the individual milking position; of course, this access should be as free as possible.

In a particularly preferred manner, the radially directed accessway or exitway of the cows, which is in the form of a ramp, widens increasingly towards the milking platform, and this in and against the direction of platform rotation. In order to ensure that the cows approaching the rotary milking parlour line up reliably one behind the other, the accessway should initially be relatively narrow in order to keep more than one cow from trying to enter a single milking station. Despite this individualization, each cow should have sufficient space as it enters the rotary milking parlour between the outwardly pivoted gates. To this end, it is especially helpful to increasingly widen the accessway in the direction of rotation as it approaches the rotary platform.

There are a number of considerations to be taken into account when designing a system such as that described above for use on a rotary parlour. A major consideration is that the cows have a clear standing space in the milking stall. Although the headlock could be movable on a track within the milking stall, the chances of the cows either being damaged by the track, or the track being damaged by the cows is increased.

It is equally important that there are no protrusions into the milking stall at other levels which could interact adversely with the cows.

Another consideration with designing mechanical equipment for rotary platforms is the amount of cow waste which is dropped onto the platform. This waste can clog mechanical systems. In preferred embodiments of the present invention, the angle of movement of the headlock is such that the cow is moved in a direction to ensure that it is in line appropriately with the milking equipment, other cows on the platform and in such a manner to allow maximum packing of cows onto the platform.

Thus, the ideal movable headlock would move cows at a consistent angle, not intrude in a potentially damaging way into the milking stall and would not be unduly susceptible to clogging caused by cow waste.

In a preferred embodiment of the present invention, there is provided a movable headlock that moves about a substantially horizontal pivot.

It can be seen that this embodiment of the present invention addresses the considerations outlined above. A horizontal pivot ensures that the headlock can move the cows at a constant angle with respect to the rotary platform. For example a vertical pivot would move the cows at a varied angle which leads to problems with alignment of the milking equipment and maximum packing of cows on the platform.

By having a horizontal pivot, the mechanism for moving the headlock can be outside or at one end of the milking stall, thus not interfering with the cows and in most cases out of the range of cow waste.

The provision of a headlock with a horizontal pivot also ensures that there is maximum clearance around the exit and entry of the rotary platform as well.

The headlock may be moved by a variety of means.

In a manual version of the present invention, the headlock may fall freely on the cow, the weight of the headlock ensuring that the cow moves into an appropriate position. However, in preferred embodiments movement of the headlock is controlled automatically by some biasing means as discussed above.

As the milking systems of the state of the art are already supplied with vacuum and air pressure, in preferred embodiments of the present invention the headlock is moved with air pressure, perhaps in the form of a pneumatic ram. For example, the ram may be provided with differential pressure that biases the headlock against the cows. When the cow is snugly fitted into the stall as a consequence of the pressure against it, the ram may cause the headlock to maintain a gentle yet steady pressure on the cow keeping it into position. This has distinct advantages in animal management over a positively driven headlock, say if an electric or hydraulic motor was used.

The activation of the headlock may be achieved by a number of means. In preferred embodiments, the motion of the rotary platform may be the actuating mechanism which causes the headlock to move the cow into the appropriate positon in the milking stall. For example, the headlock may be moved out of the way while the cow enters the stall and as the platform rotates round, the headlock may then be activated as a consequence of the platform movement and push the cow into the appropriate position.

In one preferred embodiment of the present invention, each headlock has its own individual control.

It may be possible that in some embodiments there may be provided a single device that moves the headlocks when they reach that device as a consequence of the rotary platform turning. For example, there may be provided a ramming device that pushes against each headlock when the headlock reaches same as a consequence of the rotation of the platform.

It should be appreciated that the same method by which the headlock is moved against the cow to push it into position in the milking stall may also be used to move the headlock out ouf the way of the cow so the cow can readily exit the milking stall at the end of the milking cycle.

Typically, headlocks latch automatically as soon as the cow's head enters it. While the headlocks can be manually released at the end of the milking cycle, it is preferable that the headlocks are automatically released so as to speed up the exit of the cows from the milking platform and reduce the number of operations by the farmer.

The automatic release of the headlock may be achieved by a variety of means. It should be appreciated however that as the headlock is in a variable position vertically and horizontally depending upon the size of the cow, conventional methods of releasing the headlock may not necessarily be applicable. Another consideration is that as the latching is automatic, the releasing mechanism must hold the headlock unlatched in case a cow lowers its head for a final feed through the headlock just prior to exiting the rotary platform and thus relatching same.

According to one aspect of the present invention there may be provided an actuating mechanism for the release of a headlock on a rotary platform in the form of a contoured cam.

The provision of a contoured cam which can interact with a latch release mechanism of the headlock addresses a number of considerations outlined above. Both the vertical and horizontal position of the headlock can vary as a consequence of its being moved around a horizontal pivot. Thus, the provision of a contoured cam can take into account these variations.

In preferred embodiments, the latch release mechanism is connected to an actuator that can interact with the contoured cam which is positioned above the milking stall (out of the cow's way). Preferably this cam is positioned near the exit of the rotary platform.

A preferred embodiment of the present invention will now be described with reference to the attached drawings, wherein

DESCRIPTION OF THE PREFERRED EMBODIMENT

Figure 1:
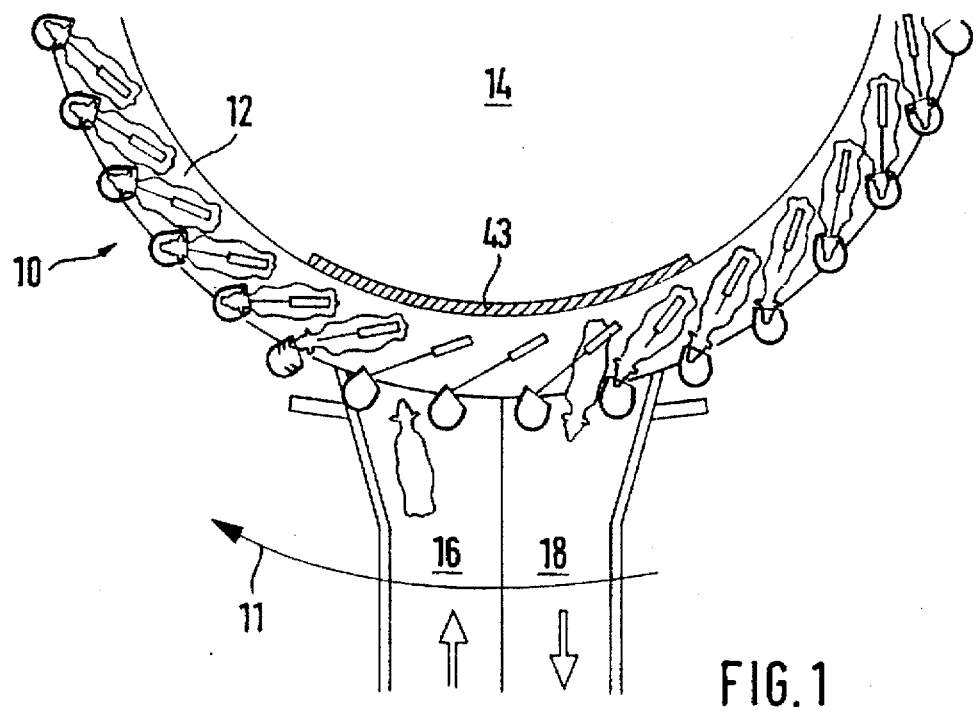
FIG. 1 is a top plan view showing the principles of this embodiment of the herringbone-type rotary milking platform, with only about one third of the circular ring-shaped milking platform being shown.

FIG. 1 shows a partial schematic view of a rotary milking parlour 10 from above, with milker pit 14 located at the center and an annular milking platform 12 slowly rotating in the direction of arrow 11; in the course of one revolution of the platform, the animals are milked by means of conventional milking equipment while positioned on the platform in a herringbone pattern with their heads pointing out. The cows enter the rotary milking parlour 10 via a radially disposed ramp-like accessway 16 which widens increasingly in the direction of platform rotation towards the platform. After having been milked during one revolution of the rotary milking platform, the animals leave the same via a ramp-like exitway 18 which is provided adjacent to the accessway 16 and parallel thereto.

Figure 2:
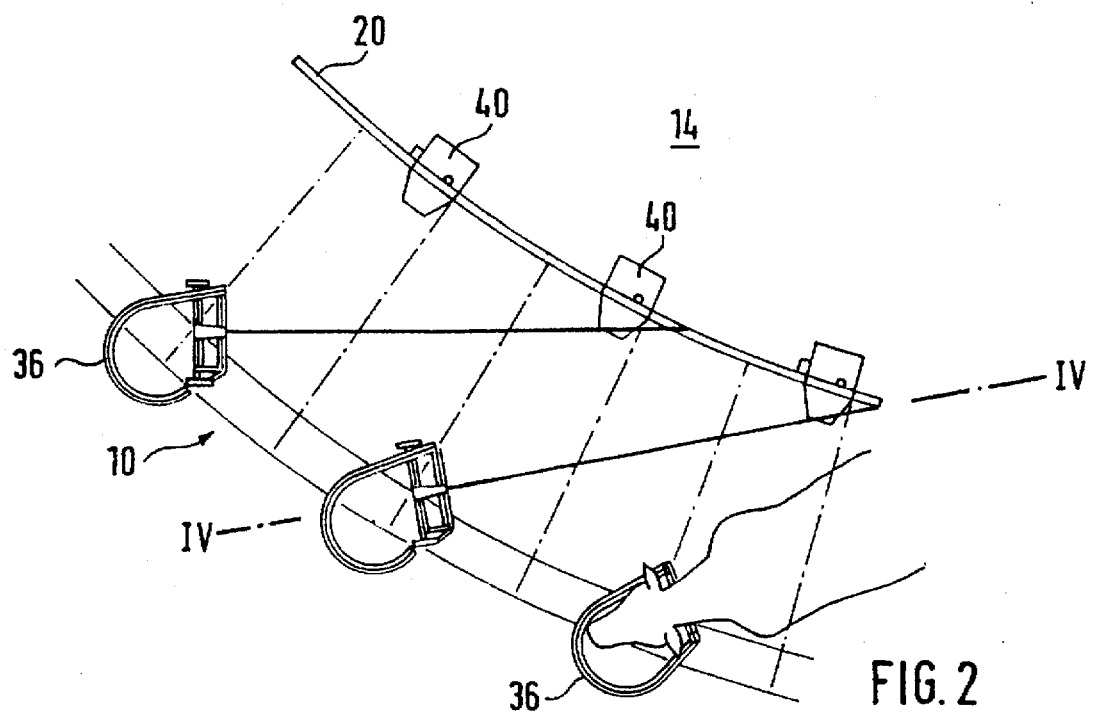
FIG. 2 shows a portion of FIG. 1 with a number of additional details on an enlarged scale.
Figure 3:
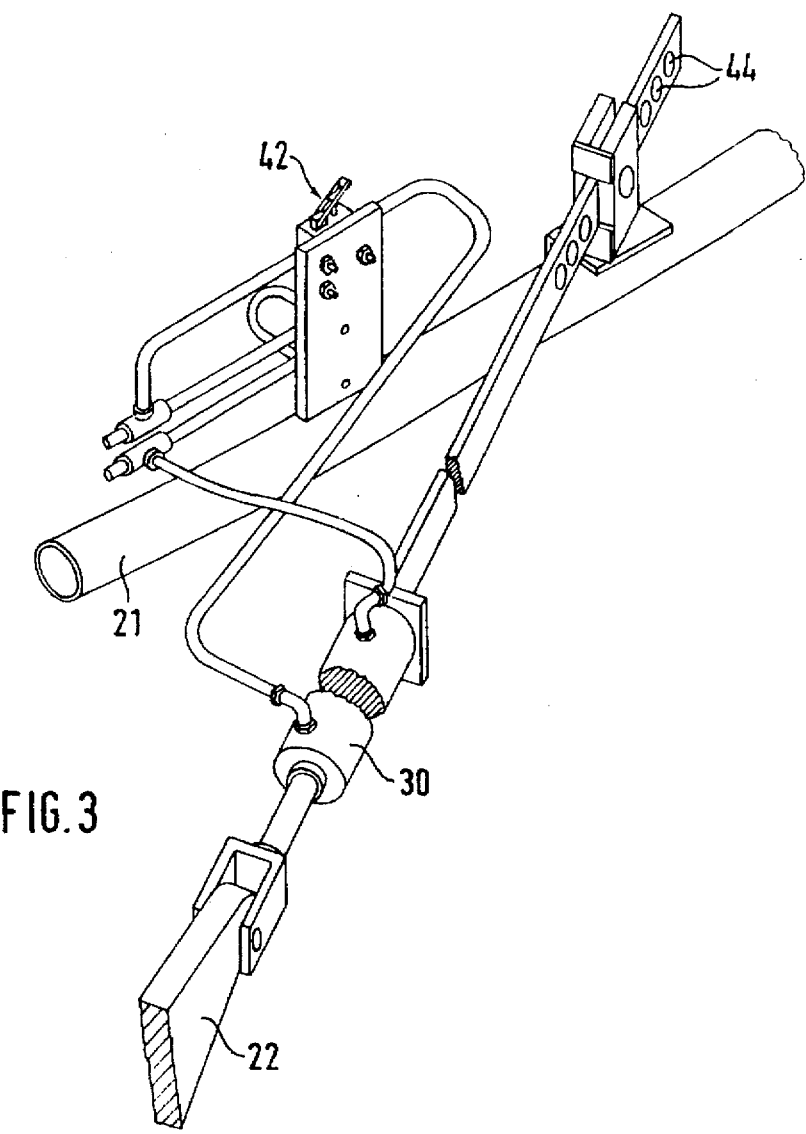
FIG. 3 shows some specific details of the gate or headlock actuating member of the preferred embodiment.
Figure 4:
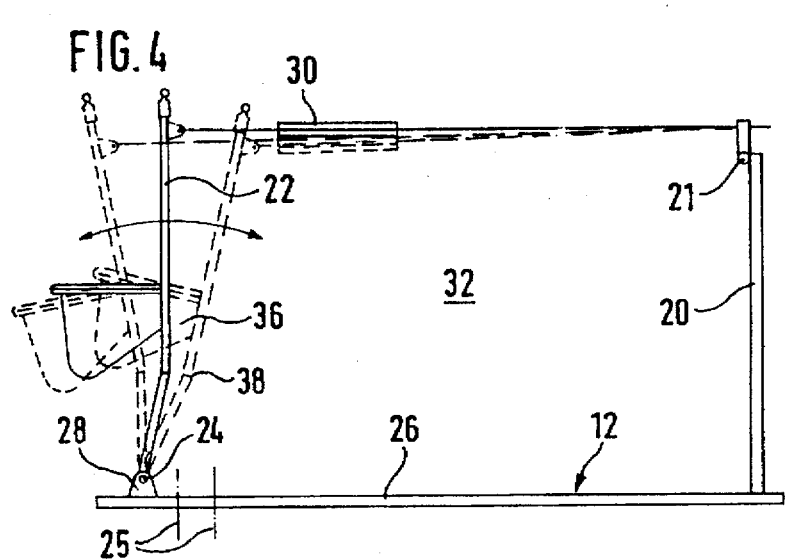
FIG. 4 shows a section along a cow position approximately on line IV—IV in FIG. 2.
Figure 5:
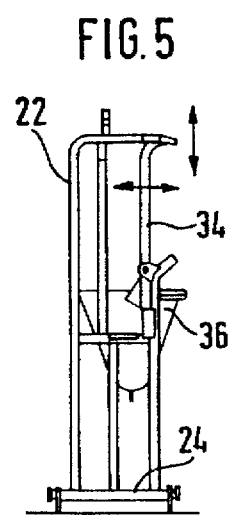
FIG. 5 shows a front elevation of a possible embodiment of a headlock for a cow.

As depicted in FIG. 1 and shown in greater detail in FIGS. 2 to 4, each animal milking position or stall 32 for a cow has associated therewith as a front barrier or milking position delimiting means on the rotary-milking platform a gate 22 pivotable about a horizontal axle 24 and optionally provided with a headlock 34 and/or a feed manger 36. FIG. 4 clearly shows that the gate 22 is pivotable into a variety of positions with the aid of actuating member 30 so as to obtain two results at the same time. Firstly, pivoting gate 22 into the rightmost position shown in FIG. 4 (or into a similar position) causes the cow (when it assumes its milking position 32) to move as far back as possible so that the rear end of its body abuts the rear barrier or milking station delimiting means (reference numeral 20); if that rear delimiting means is configured as shown in FIG. 2, the cow contacts a cabinet-like structure 40 accommodating the joints and controls for the milking equipment associated with each milking station. Secondly, pivoting gate 22 into the leftmost position in FIG. 4 (or into a similar position) creates enough space for the animals entering the rotary platform in an approximately radially inward direction (FIG. 1) to turn about 120° to the left when they step on the platform, as is necessary to assume the conventional herringbone pattern on the platform. As soon as a cow has performed this leftward turn in FIG. 1, actuating member 30 is controlled by a suitable revolving cam mechanism in dependence on the movement of the rotary milking platform to swing gate 22 to the right (in FIG. 4) so as to gently push the cow in its milking position 32 towards the rear barrier or milking station delimiting means 20. Once substantially fixed in this position, the cow stays in its milking position 32 for the entire revolution of the rotary milking platform and will be milked in a conventional manner. After one revolution of the milking platform, when the cow reaches the ramp-like exitway 18, actuating member 30 again is cam controlled to open gate 22 rapidly and without delay, i.e. it pivots gate 22 to the left in FIG. 4 for the release of the cow so that the animal may leave its milking position 32 in a substantially radially outward direction as shown in FIG. 1.

FIG. 3 shows a specific configuration and arrangement of the actuating mechanism including actuating member 30, with the latter in this example being a double-acting fluid cylinder, of which the ram is pivotably coupled at its outer end to a lug on gate or headlock 22, the latter not being shown in detail in FIG. 3. However, as shown in FIG. 4, this actuating mechanism is located above the maximum height of the cows between the top end of gate 22 and a circularly disposed upper carrier member 21 associated with the rear barrier or milking stall delimiting means 20 (FIG. 4), whereby this actuating mechanism does not occupy additional space outside the milking platform or any room within the cows' range of movement in milking position 32.

Activation of the double-acting fluid cylinder (e.g. by way of air or hydraulic oil) in the appropriate timed sequence in dependence on the rotary position of the rotary milking platform is effected in a conventional manner by a cam-controlled valve 42 (FIG. 3) via a suitably contoured camming surface 43 (FIG. 1) located on the milking platform 10; a discussion of the details of such camming surfaces will be unnecessary because they are well known to the person skilled in the art. It is noted, however, that actuating member 30 biases the gate or headlock 22 in a direction towards a cow present in milking position 32 with a relatively low force so as to not place the cow under excessive constraint. On the other hand, at the end of the revolution of the milking platform, gate 22 is subjected to a relatively strong force to impart to it a sudden pivoting opening movement so that the opening movement is a rapid one and the cow has sufficient time to leave its milking station via exit ramp 18. Since it is customary in conventional milking installations to use different air pressures, it may be particularly advantageous to use as actuating member 30 a double-acting air cylinder to which high-pressure air is applied in the gate opening direction and low-pressure air in the gate closing direction.

In order to allow the distance between pivoting axle 24 of gate 22 and the rear barrier or milking station delimiting means 20 to be varied so as to adapt it to herds of cows having different average lengths, pivoting bearing 28 is adapted to be fastened to floor 26 of milking platform 22 in a variety of distances from rear barrier or milking station delimiting means 20—e.g. by several sets of fastening bores in floor 26, as shown at 25 in FIG. 4. Also, since the pivoting bearing projects upwards from floor 26, gate or headlock 22 is bent as at 38 to create an additional distance from the normal treading area of the cow present in the milking position 32 in order to prevent the bearing or hinge structure from causing damage to the cow's hooves.

Figure 6:
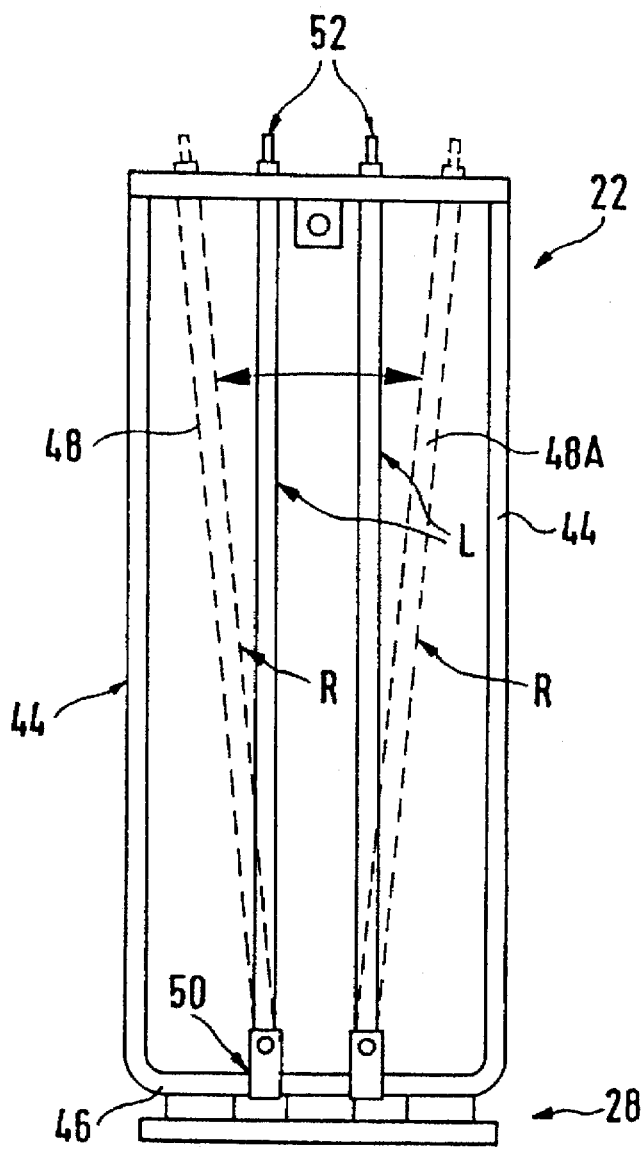
FIG. 6 shows a front elevation of an alternative headlock which would replace the one of FIG. 5.

FIG. 6 shows the alternative headlock which would replace the one of FIGS. 4/5. It consists of a U-shaped pipe frame 44, the horizontal bottom part 46 of which is hinged at 28 to the floor of the milking platform to cause the pipe frame to perform the pivoting movement as indicated in FIG. 4 under the influence of the double acting fluid cylinder 30. Two moveable headlock rails 48, 48A are pivotably connected to said bottom part 46 by way of pivot points 50 so that these rails can be set in the plane of U-shaped pipe frame 44 to run parallel to each other (the headlock position L) or to be moved away from each other (the release position R) in order to release the cow's head from headlock/front barrier 22.

Figure 7:
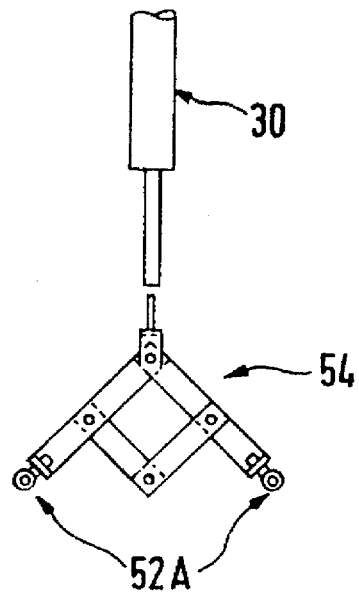
FIG. 7 shows a top view of a connection means having the form of a parallelogram and connecting the actuating means/ double-acting pneumatic cylinder of each milking position with the upper ends of the two moveable rails of each headlock.

FIG. 7 shows how the cylinder 30 is connected to the very top of the headlock 22, i.e. the ends 52A of a parallelogram 54 are connected to the top end 52 of the two headlock rails 48, 48A, i.e. the headlock rails are operated between the positions R and L by cylinder 30 via parallelogram 54: Before the cow has entered the milking stall 32, the headlock is in the fully open position R because the cylinder 30 is fully extended (far left position in FIG. 4) and the parallelogram 54 is open. Once the cow has entered, the headlock 22 and the parallelogram 54 close as the cylinder 30 begins to retract. As a further consequence thereof, the cow is "indexed" (moved backward) into position abutting the rear barrier 20, whereafter the cylinder holds a fully retracted position, with the parallelogram 54 being closed and the headlock being locked (position L). Once the cow approaches the exitway 18 after having been milked during its travel on the milking platform 12, the cylinder 30 begins its forward movement (from right to left in FIG. 4), which will first open the parallelogram 54 thus moving the headlock rails 48, 48A to position R. Continued forward movement of cylinder 30 will then move the open headlock away from the cow into a position to the far left in FIG. 4, which will give the cow sufficient room to exit the stall 32 via exitway 18 without any problem.

In a preferred mode of operation the milking of the cows may be achieved in the following manner.

(a) A cow lines up to enter a milking stall at the entry of the rotary platform. This milking stall has a headlock pulled as far back as possible so as to allow maximum clearance for the cow to enter the platform and hence maximum speed of entry.

(b) As the rotary platform turns with the cow in the milking stall, an air ram attached to the top of the headlock is activated pushing the headlock toward the cow about its horizontal pivot at the bottom of the gate/headlock. This pushes the cow into the suitable position in the milking stall and holds it there through gentle pressure by the air ram.

(c) As the rotary platform nears the exit, the automatic delatching device of the headlock may operate.

(d) At approximately the same time, the air ram may pull the headlock back to its original position thus creating sufficient room for the cow to leave the rotary platform achieving maximum exit speed.

List of reference numerals 10 rotary milking parlour
11 arrow/direction of rotation
12 milking platform
14 milker pit
16 accessway
18 exitway
20 rear barrier
22 gate/headlock/front barrier
24 horizontal axle
25 fastening bores
26 floor
28 pivoting bearing/hinge
30 actuating member—double-acting fluid cylinder
32 animal milking position/stall
34 headlock
36 feed manger
40 cabinet-like structure
42 valve (cam controlled)
44 U-shaped pipe frame
46 bottom part of 44
48, 48A headlock rails
50 pivot points of 48, 48A
52, 52A parallelogram fixing points
54 parallelogram

We claim:

1. A rotary milking parlour comprising:

an annular milking platform having a floor and being divided into a series of elongated milking stalls each having a longitudinal axis, said milking stalls being arranged in a herringbone pattern along the annular milking platform, and a central milker pit;

a radially directed accessway at the outer periphery of the milking platform to allow cows to enter their milking stalls head first from the outside;

an external, radially directed exitway from the milking platform and the adjacent accessway to allow the cows to exit their milking stalls head first;

radially inner rear milking stalls delimiting means defining a rear barrier for each stall;

a gate associated with each milking stall and adapted to be moved to an access position, each said gate serving as a milking stall delimiting means defining a radially outer front barrier; and a horizontal axle substantially transverse to the longitudinal axis of each milking stall pivotally carrying each of said gates, wherein the axle of each gate is part of a hinge/bearing fastened to the floor of the milking platform, each said gate being pivotable towards a cow in the stall to insure that the cows will abut the rear barrier at any time during the milking process.

2. A rotary milking parlour as in claim 1, wherein the pivoting axle carrying each gate or front barrier is part of the hinge/bearing fastened to the floor of the milking platform.

3. A rotary milking parlour as in claim 2, wherein the gate has a bend in a lower section such that its bottom end together with the hinge/bearing supporting the pivoting axle is located at a sufficient horizontal distance forward of the cows' treading and walking area on floor on the milking platform in order to protect the cows' hooves from being injured thereby.

4. A rotary milking parlour as in claim 1 including an actuating member, wherein the gate or front barrier of each milking stall is adapted to be pivoted by said actuating member in a direction towards the milking stall or outwardly away from the milking stall in dependence on the rotary position of the milking stall during the course of the rotary platform movement.

5. A rotary milking parlour as in claim 4 wherein the actuating member is operatively connected to said gate to apply to it a force gentle on the cow when said gate is pivoted in a direction towards the milking stall and a significant higher force and speed when pivoted away from the milking stall after the cow has left the accessway or reaches the exitway.

6. A rotary milking parlour as in claim 5 wherein the force applied to the gate and directed towards the cow to retain it in the milking stall is such that it is easily overcome by the cow.

7. A rotary milking parlour as in claim 5 wherein the actuating member comprises a double-acting fluid cylinder, said fluid cylinder having low pressure applied to it to act towards the milking stall and having high pressure applied to it to act away from the milking stall.

8. A rotary milking parlour as in claim 4 wherein the force applied to the gate and directed towards the cow to retain it in the milking stall is such that it is easily overcome by the cow.

9. A rotary milking parlour as in claim 8 wherein the actuating member comprises a double-acting fluid cylinder, said fluid cylinder having low pressure applied to it to act towards the milking stall and having high pressure applied to it to act away from the milking stall.

10. A rotary milking parlour as in claim 4 wherein the actuating member comprises a double-acting fluid cylinder, said fluid cylinder having low pressure applied to it to act towards the milking stall and having high pressure applied to it to act away from the milking stall.

11. A rotary milking parlour as in claim 10, wherein the actuating member for pivoting the gate defining the front barrier is articulated to the rear milking stall delimiting means and to the top of the gate and is disposed above the positions of the cows on the milking platform.

12. A rotary milking parlour as in claim 11, wherein the gate defining the front barrier is in the form of a headlock.

13. A rotary milking parlour as in claim 12, wherein the headlock comprises a U-shaped frame having a horizontal bottom part, a top, and two headlock rails and defining a frame plane, in which the horizontal bottom part is hinged to the floor and supports pivot points for the two headlock rails pivotable in the plane of the frame and connected at the top to the cylinder via a parallelogram.

14. A rotary milking parlour as in claim 4, wherein the rear milking stall delimiting means is continuously curved to correspond to the annular milking platform and in that the space there remaining between the animals because of the herringbone pattern between the rear end of the more forwardly placed cow and the flank of the more rearwardly placed animal is occupied at least partly by a cabinet-like receptacle accommodating and protecting against contamination all joints, controls and indicators required for the respective milking stall.

15. A rotary milking parlour as in claim 4, wherein the radially directed accessway and the radially directed exitway are widened increasingly in or against the direction of rotation of rotary milking parlour as they approach the rotary milking parlour.

16. A rotary milking parlour as in claim 1, wherein the gate defining the front barrier is provided with a feed manger.

17. A rotary milking parlour as in claim 1, wherein the gate has a bend in a lower section such that its bottom end together with the hinge/bearing supporting the pivoting axle is located at a sufficient horizontal distance forward of the cows' treading and walking area on floor on the milking platform in order to protect the cows' hooves from being injured thereby.

18. A rotary milking parlour as in claim 1, wherein the rear milking stall delimiting means is continuously curved to correspond to the annular milking platform and in that the space there remaining between the animals because of the herringbone pattern between the rear end of the more forwardly placed cow and the flank of the more rearwardly placed animal is occupied at least partly by a cabinet-like receptacle accommodating and protecting against contamination all joints, controls and indicators required for the respective milking stall.

19. A rotary milking parlour as in claim 1, wherein the radially directed accessway and the radially directed exitway are widened increasingly in or against the direction of rotation of rotary milking parlour as they approach the rotary milking parlour.

20. A rotary milking parlour as in claim 1, wherein the gate defining the front barrier is in the form of a headlock.

* * * * *